United States Patent [19]

Günther et al.

[11] 3,710,545

[45] Jan. 16, 1973

[54] PROCESS FOR THE SEPARATION OF IMPURITIES FROM CRUDE GAS

[75] Inventors: Klaus Günther; Erich Schneck; Hartmut Voigt, all of Frankfurt; Karlheinrich Wesselborg, Lorsbach, all of Germany

[73] Assignee: Farbwerke Hoechst Aktiengesellschaft vormals Meister Lucius & Bruning, Frankfurt/Main, Germany

[22] Filed: March 12, 1971

[21] Appl. No.: 123,829

[30] Foreign Application Priority Data

March 14, 1970 Germany.....................P 20 12 154.4

[52] U.S. Cl. .............................................. 55/29
[51] Int. Cl. ........................................... B01d 53/14
[58] Field of Search ........................... 55/29–32, 82

[56] References Cited

UNITED STATES PATENTS

| | | | |
|---|---|---|---|
| 3,403,522 | 10/1968 | Henry | 55/31 |
| 2,765,049 | 10/1956 | Nafziger | 55/29 |
| 3,400,512 | 9/1968 | McKay | 55/82 |
| 3,589,104 | 6/1971 | Panzareua | 55/32 |

*Primary Examiner*—Charles N. Hart
*Attorney*—Curtis, Morris & Safford

[57] ABSTRACT

Readily polymerizing impurities are separated from crude gas obtained by pyrolysis by washing the crude gas with water and then pre-cooling the crude gas which is still hot with atomized cold calcium chloride solution before drying it with circulated cold calcium chloride solution. Part of the calcium chloride solution is continuously removed from the cycle of calcium chloride solution.

3 Claims, No Drawings

PROCESS FOR THE SEPARATION OF IMPURITIES FROM CRUDE GAS

The present invention relates to a process for the separation of readily polymerizing impurities, especially of unsaturated low molecular weight hydrocarbons containing oxygen and nitrogen, from crude gas which has been formed in the thermal cracking of hydrocarbons and obtained under pressures within the range of from 12 to 25 atmospheres absolute at temperatures within the range of from 0° to 30°C after a water wash and is then dried at temperatures within the range of from −10° to −35°C with a circulated calcium chloride solution of 28 to 32 percent strength.

When treating crude gas formed in the thermal cracking of hydrocarbons or mixtures of hydrocarbons, for example, petroleum or gasoline, problems may occur (after the water wash) from resinous solid substances forming incrustations, thus causing increased losses of pressure and other undesirable phenomena in the drying operation sometimes as soon as after a working time of only some hundred hours.

Examination of the crust-forming solid substances has shown that the latter are mainly polymers of unsaturated low molecular weight hydrocarbons containing oxygen and nitrogen. The predominant part of these substances resemble the so-called nitro resins which interfere with the treatment of coke oven gas by clogging pipes and apparatus. Said compounds are formed by reaction of NO and $NO_2$ substantially with cyclopentadiene. All these components are also contained in crude gas obtained by pyrolysis. To prevent the formation of these annoying and partially dangerous compounds, the nitric oxide of the coke oven gas is oxidized in coking plants by the addition of chlorine dioxide. The reaction products $NO_2$ and NOCl and excess amounts of $ClO_2$ are removed together with residual $CO_2$ by washing with lye or by means of reducing agents. This mode of proceeding requires considerable capital investment for apparatus. Moreover, undesirable reactions of the chlorine dioxide with other components of the crude gas cannot be avoided.

Another known process for removing nitric oxide from coke oven gas consists in the oxidation with ozone which reacts with nitric oxide just as rapidly as chlorine dioxide, but even faster with other components of the crude gas. In this case, however, peroxides may be formed, which means a considerable risk when the treatment with ozone is followed by a cooking in a low temperature plant.

Another known process which serves mainly to prevent the formation of explosive resins and which is used in the production of synthesis gas for the manufacture of ammonia, consists of increasing the content of dienes and favors a controlled, increased and harmless formation of resin. However, this process cannot be used for preventing the formation of polymers in the drying of crude gas obtained by pyrolysis, rather this process has an opposite objective.

A pre-purification of coke oven gas, called "-gasorefining process," has been proposed, according to which the coke oven gas is purified on molybdenum or cobalt-molybdenum catalysts to prevent resin formation in evaporators and heat exchangers. The application of this process to the purification of crude gas obtained by pyrolysis requires pressure and temperature conditions which, in the purification of crude gas obtained by pyrolysis, can be obtained between the water wash and the drying operation only with relatively high expenditure of apparatus and energy. Moreover, the catalyst would also initiate or favor reactions that are undesirable.

It is the object of the process of the invention to reduce the formation of polymers to a tolerable proportion while avoiding the above disadvantages.

The present invention provides a process for the separation of readily polymerizing impurities, especially of unsaturated low molecular weight hydrocarbons containing oxygen and nitrogen, from crude gas which has been formed in the thermal cracking of hydrocarbons and obtained under pressures within the range of from 12 to 25 atmospheres absolute at temperatures within the range of from 0° to 30°C after a water wash and is then dried at temperatures within the range of from −10° to −35°C with a circulated calcium chloride solution of 28 to 32 percent strength, wherein the stream of crude gas leaving the water wash is slowly and continuously cooled by direct contact with atomized cold calcium chloride solution to a temperature which is at most 12°C above the discharge temperature of the calcium chloride solution used for drying, and wherein furthermore at least such an amount of salt solution is continuously removed from the cycle of salt solution as corresponds to an amount of 8 kg calcium chloride per 1,000 normal cubic meters of crude gas through-put.

The process of the invention is carried out such that the stream of crude gas leaving the water wash is pre-cooled in several places of the piping by direct injection of cold calcium chloride solution and then cooled directly in a column by a colder cycle of brine flowing in counter-current. The difference in temperature between the arriving gas and the lower trays of the column can be reduced by withdrawing a partial stream of brine from the middle of the column, which partial stream may then be used, for example, for the precooling of the gas by injection of calcium chloride solution into the piping. The further measure in accordance with the invention comprises the withdrawal of part of the circulating salt solution of which, since its concentration continuously varies, at least such an amount is removed after the passage of 1,000 normal cubic meters crude gas as corresponds to 8 kg calcium chloride. Instead of the calcium chloride solution, solutions of other alkaline earth metal halides, for example magnesium chloride solutions, may be used. Mixtures of any desired alkaline earth metal halide and alkali metal halide solutions may also be used.

These very simple measures in accordance with the invention enable the formation of polymer deposits in the drying apparatus to be checked, this being surprising. The trays of the commonly used columns remain free from disturbing deposits after even more than 1,000 working hours. This is also the case when the drying is combined with a wash, for example, with the use of a petroleum fraction the boiling behavior of which resembles that of gasoline.

The effect obtained by the process of the invention is difficult to explain in view of the heterogeneous composition of the polymer deposits hitherto formed. By elementary analysis of the deposits nitrogen and oxygen were determined in addition to carbon and hydrogen. The existence of nitro groups could be proved. The calcium chloride solution removed in the process of the invention contains the same elements and groups. The organic compounds contained in the solution are, however, substantially present in the low molecular state.

By the injection of the cold calcium chloride solution into the stream of crude gas, condensation and dissolution processes to which some readily polymerizing compounds are subjected in the first place are presumably initiated and their course is favored by the slow continuous cooling. This supposition is confirmed by the fact that the effect of the process of the invention is enhanced by elongating the temperature profile, that is by reducing the temperature drop per meter of passage by gas and by increasing the amount of removed calcium chloride beyond the indicated minimum value.

The pressure differences obtained in the drying column can be regarded as a measure of the crust formation on the trays. It has been found that with a temperature drop of 3° to 7°C per meter of passage by gas and with a discharged amount corresponding to 10 to 20 kg calcium chloride per 1,000 normal cubic meters of crude gas, the increase of the pressure differences measured for the first 1,000 working hours is particularly small.

It has already been proposed to remove a partial stream from salt solutions being circulated in drying plants. The amount to be discharged depended in that case on the attainment of a sufficient removal of solid impurities and on the degree to which the salt solution had been diluted. In the interest of economy and to minimize the charge of sewage the removed amounts were kept as small as possible. The advantages obtained by the process of the invention, however, justify the increased expenditure for the replacement of the discharged amounts and for a regeneration of the discharged solution.

The following examples serve to illustrate the invention.

EXAMPLE 1

A crude gas obtained in the thermal cracking of gasoline which substantially contained ethylene, hydrogen, carbon monoxide, acetylene, carbon dioxide, methane and small amounts of polymerizable unsaturated hydrocarbons containing oxygen and nitrogen, left a water wash at temperatures varying only little around 14°C. The gas has a pressure of 20 atmospheres absolute. The gas flowed through a pipe to the lower part of a drying column.

The amount of crude gas was 350 normal cubic meters per hour. 1,500 liters of a calcium chloride solution of about 30 percent strength were circulating over the trays of the drying column.

Before the drier, at a distance of about 4 meters from the inlet to the drier about 1,000 liters/hour of a 30 percent calcium chloride solution were injected into the pipe. Most of the solution thus introduced deposited in the sump of the drying column. From the sump of the drying column the salt solution was recycled by pumps via coolers to the trays of the drying column. A partial brine current was removed from the middle of the column by a pump and used for the injection of calcium chloride solution.

15 liters/hour of salt solution were removed and replaced by fresh solution. In normal operation a sump temperature of −14°C was maintained in the drier. The temperature of the arriving gas was adjusted to −6°C, which corresponded to an average reduction of the temperature drop in the pipe between washer and drier of 5°C per meter. The leaving gas had a temperature of −30°C.

The pressure difference measured above and below the two lowest trays of the drying column was 56 millimeters of water column after 50 hours of working and 57 millimeters of water column after 1,000 hours of working.

EXAMPLE 2

When proceeding under the same conditions but adjusting the temperature of the gas at the inlet to the drier to −2°C and restricting the removal of the salt solution to 9 l/h, the pressure difference had been increased after 1,000 hours of working from an initial 56 millimeters of water column to 58.5 millimeters of water column.

What is claimed is:

1. A process for the separation of readily polymerizing impurities, including unsaturated low molecular weight hydrocarbons containing oxygen and nitrogen, from crude gas formed in the thermal cracking of hydrocarbons and obtained under pressures within the range of from 12 to 25 atmospheres absolute at temperatures within the range of from 0° to 30°C after a water wash and which gas is dried at temperatures within the range of from −10° to −35°C with a circulated calcium chloride solution of 28 to 32 percent strength, said process comprising slowly and continuously cooling a stream of crude gas, after the water wash, by directly contacting with atomized cold calcium chloride solution said crude gas and cooling said stream to a temperature which is at most 12°C above the discharge temperature of the calcium chloride solution used for drying, and continuously removing at least such an amount of salt solution containing water and low molecular weight hydrocarbons containing oxygen and nitrogen from the cycle of salt solution as corresponds to an amount of 8 kg and up of calcium per 1,000 normal cubic meters of crude gas through-put.

2. The process of claim 1 wherein the temperature drop between water wash and drying is within the range of from 3° to 7°C per meter of passage by gas.

3. The process of claim 1 wherein such an amount of salt solution is removed as corresponds to an amount of 10 to 20 kg calcium chloride per 1,000 normal cubic meters of crude gas through-out.

* * * * *